UNITED STATES PATENT OFFICE.

SAM AVIS, OF CHICAGO, ILLINOIS, ASSIGNOR OF THREE-FOURTHS TO ABRAHAM Y. AMEER, OF CHICAGO, ILLINOIS, AND JOSEPH YONAN AND JEREMIAH N. BABOO, BOTH OF GARY, INDIANA.

GRAPE-JUICE SYRUP AND PROCESS OF TREATING THE SAME.

1,381,613.        Specification of Letters Patent.        Patented June 14, 1921.

No Drawing.     Application filed September 18, 1919. Serial No. 324,289.

*To all whom it may concern:*

Be it known that I, SAM AVIS, a citizen of the Empire of Persia, and a resident of Chicago, in the county of Cook, State of Illinois, have invented certain new and useful Improvements in Grape-Juice Syrup and processes of treating the same, of which the following is a specification.

This invention relates to a concentrated food product or syrup obtained from the juice of the grape, and has for its object the neutralizing and removal of the active ferment of ordinary grape juice, without which the present food product does not have any keeping or commercial value, and at the same time permitting it to retain its sweet and saccharine qualities for an indefinite period.

Another object is the production of a sweet and palatable syrup from grape juice adapted for use as a food covering or spreading, and as a combination with fruit and like food articles in the same manner as the ordinary syrups now in use, all as will hereinafter more fully appear.

In carrying out the present improvement the juice after its expression from the crushed grapes is permitted to rest and settle for a period of one or more hours, after which the clear liquor is decanted off and a quantity of whiting which is pulverized chalk cleansed from impurities is added thereto in the proportions of from three or more ounces of whiting to one gallon of the clear grape juice or liquor.

The described mixture is throughly agitated by any usual means, and during such operation the whiting is brought into intimate contact with the ferment organisms largely contained in the grape juice and combines with and neutralizes said organisms. After such agitation the mixture is left to settle for a period of from one to three hours and the clear liquor is then decanted off, leaving the mixed whiting and ferment as a remaining sediment.

The clear liquor thus obtained is placed in an evaporating apparatus of any usual and suitable form and exposed to a concentrating operation, preferably of an intermittent nature with periods of rests during such operation of a half an hour more or less, and until the liquor is reduced in volume from one gallon to one or two quarts, depending on the original richness in grape sugar of the grape juice. During such concentrating operation the syrupy product when cooled is ready for use as a covering syrup for cakes and the like, for mixture with different fruits as a preservative and food constituent of such fruits in their preserved condition, and for flavorings for candies and other confectioneries.

With the herein described treatment the grape juice syrupy product is adapted to retain its original properties unchanged for a long period of time under ordinary conditions of packaging and storage.

Having thus fully described my said invention what I claim as new and desire to secure by Letters Patent, is:—

1. The process of treating grape juice for the neutralizing and removal of the active ferment thereof and permitting it to retain its sweet and saccharine qualities for an indefinite period which consists in first adding a predetermined quantity of whiting to the juice, thoroughly agitating the mixture of juice and whiting into intimate contact with the active ferment contained in the juice, permitting the mixture to settle, decanting off the juice so as to leave the ferment and whiting as a sediment and finally submitting the juice to a concentrating operation for producing a grape juice syrup.

2. A food product consisting of grape juice from which the active ferment has been removed.

Signed at Chicago, Illinois this 16th day of September, 1919.

SAM AVIS.